E. THOMSON.
SPOT WELDING THIN SHEETS.
APPLICATION FILED MAY 10, 1913.
1,085,769.
Patented Feb. 3, 1914.
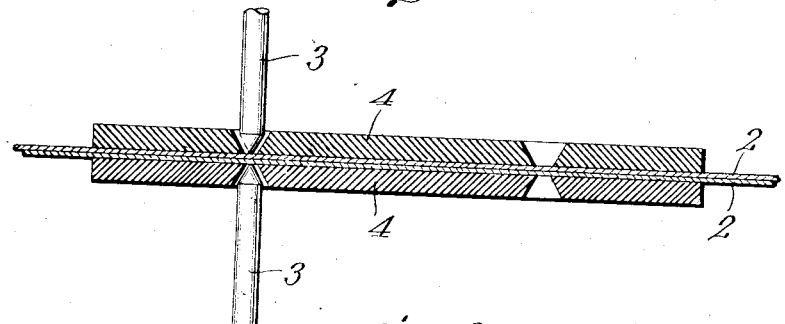
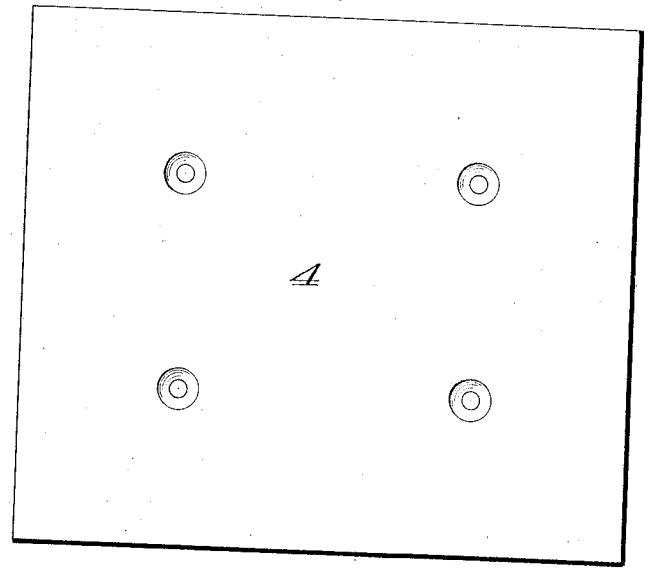
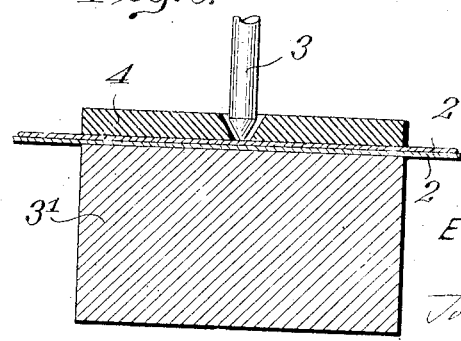
WITNESSES
INVENTOR
ELIHU THOMSON
BY
ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

SPOT-WELDING THIN SHEETS.

1,085,769.

Specification of Letters Patent.

Patented Feb. 3, 1914.

Application filed May 10, 1913. Serial No. 766,728.

*To all whom it may concern:*

Be it known that I, ELIHU THOMSON, a citizen of the United States, and a resident of Swampscott, in the county of Essex and State of Massachusetts, have invented certain new and useful Improvements in Spot-Welding Thin Sheets, of which the following is a specification.

My invention relates to the art of uniting plates or sheets of metal by the process known as electric spot welding and more particularly to that special method of practising the art in which the spots of welded union are produced by a pointed electrode or electrodes forced against the metal sheets at the spot to be welded and serving at the same time to pass the welding current through the pieces.

The object of the invention is to avoid the difficulties experienced in the process as heretofore practised from the tendency of the metal sheets or plates, particularly when they are made of very thin sheet metal, to buckle or draw in their unwelded portions, owing to the inequality of the heating and pressure as between the portions involving the welded spots and the unwelded portions or areas.

My invention consists essentially in clamping the unwelded portions of the thin sheet metal plates that are to be welded so as to press them firmly together and, while maintaining such clamping pressure, making the electric spot weld by the application of the pointed electrode at the unclamped part of the plate where the weld is to be made.

The accompanying drawings show in Figure 1 in cross-section devices that may be employed for practising the invention as applied to the spot welding of two thin metal sheets at a number of spots. Fig. 2 is a plan of the same apparatus. Fig. 3 shows a modification of the appliances that may be employed in carrying out the process.

Referring to Fig. 1, the two thin plates or sheets of metal to be welded together at a spot or spots are indicated at 2, while 3 indicates pointed welding electrodes of any desired form or character adapted for electrically welding the sheets together in a spot or spots.

In the practice of my invention as illustrated in Fig. 1, two such electrodes are shown as employed, adapted to press the work together between them. My invention however is not limited to such use of two pointed electrodes but may be employed where one only of them is pointed and as will be presently described.

4, 4 indicates two rigid plates perforated at spots coinciding with the spots to be welded and between which the plates 2, 2 are inserted and firmly clamped together by any desired mechanical appliance, prior to the electric welding operation proper. These plates should be adapted to clamp the sheet metal plates very firmly immediately around the spots to be welded, although for the best effect the clamping of the surface of the sheet metal plates should be over their whole unwelded areas. After the clamping has been effected and while it is maintained the electrodes 3, 3 are applied to exert pressure in the spots of welded union and to furnish the heating current as well understood in the art.

A number of spots of welded union distributed over the whole area of the plates 2 may be made one at a time by the application of the electrodes through the openings in the clamping devices or, as will be obvious, the welding pressure by means of electrodes may be applied at all of said spots at once after the necessary clamping pressure has been applied by the plates 4.

In the modification illustrated in Fig. 3, but one pointed electrode 3 is employed and the opposite electrode 3′ is shown as a block of area larger than the spot and serves likewise as the under one of the clamping blocks or plates 4. The devices shown in Fig. 3 are employed in the same manner as in the case of the devices shown in Fig. 1, the sheets of metal 2 being first clamped firmly between the plates 4 and 3′ and thereafter, and while clamping pressure is maintained, the electrode 3 is inserted through the opening in the clamping plate 4 and the welding pressure and heating current are applied at the spot of welded union.

What I claim as my invention is:—

1. The hereindescribed improvement in welding sheet metal at a spot or spots by the electrode process, consisting in clamping the sheets firmly together over their unwelded areas or portions not to be welded and then, while maintaining the clamping pressure, applying the welding pressure and current at the unclamped part or spot to be welded.

2. The improvement in welding two thin sheets of metal together by the electrode welding process, consisting in clamping the two sheets or plates of metal together, leaving both of them exposed at the spots of welded union and while maintaining the pressure effecting the weld at said spots by the electrode process.

3. The hereindescribed improvement in the electric welding of two thin sheets of metal together at a spot in their opposed areas, consisting in clamping them firmly together immediately around said spot, leaving the points to be welded exposed for application of the welding current and pressure and then, while maintaining the clamping pressure, effecting the welding at said spot.

Signed at Lynn in the county of Essex and State of Massachusetts this 2nd day of May A. D. 1913.

ELIHU THOMSON.

Witnesses:
 JOHN A. MCMANUS, Jr.,
 HENRY A. ANDERSEN.